US012609367B2

(12) United States Patent
    Kim

(10) Patent No.:     US 12,609,367 B2
(45) Date of Patent:         Apr. 21, 2026

(54) APPARATUS AND METHOD FOR DETECTING SWELLING OF BATTERY MODULE

(71) Applicant: LG Energy Solution, Ltd., Seoul (KR)

(72) Inventor: Young-Hwan Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 973 days.

(21) Appl. No.: 17/778,084

(22) PCT Filed: Nov. 12, 2020

(86) PCT No.: PCT/KR2020/015888
     § 371 (c)(1),
     (2) Date: May 19, 2022

(87) PCT Pub. No.: WO2021/101168
     PCT Pub. Date: May 27, 2021

(65)              Prior Publication Data
     US 2023/0006273 A1      Jan. 5, 2023

(30)        Foreign Application Priority Data

Nov. 20, 2019    (KR) ........................ 10-2019-0149841
    Nov. 10, 2020    (KR) ........................ 10-2020-0149665

(51) Int. Cl.
     *H01M 10/48*          (2006.01)
     *H01M 10/42*          (2006.01)
              (Continued)
(52) U.S. Cl.
     CPC ....... *H01M 10/488* (2013.01); *H01M 10/425* (2013.01); *H01M 10/482* (2013.01);
              (Continued)

(58) Field of Classification Search
     CPC ....... H01M 10/48; H01M 10/425–488; H01M 50/202–211; H01M 50/242–289;
              (Continued)

(56)              References Cited

U.S. PATENT DOCUMENTS

2007/0122691 A1     5/2007   Lee et al.
     2011/0121787 A1     5/2011   Kim et al.
              (Continued)

FOREIGN PATENT DOCUMENTS

EP          2960966 A1     12/2015
     EP          3163672 B1      2/2019
              (Continued)

OTHER PUBLICATIONS

Park, KR-20180113416-A machine translation, 2018 (Year: 2018).*
              (Continued)

*Primary Examiner* — Jonathan G Leong
*Assistant Examiner* — Kan Luo
(74) *Attorney, Agent, or Firm* — Lerner David LLP

(57)              ABSTRACT

An apparatus for detecting swelling of a battery module, which includes a swelling detection panel having an edge in contact with an inner surface of a battery module housing; a slant portion configured to protrude from the inner surface of the battery module housing and having a slant surface extending from a first location adjacent to the edge of the swelling detection panel to a second location while forming a predetermined angle with the inner surface; a contact sensor unit installed to the inner surface of the battery module housing immediately adjacent to an end of the slant surface corresponding to the second location; and a control unit configured to receive a swelling detection signal from the contact sensor unit when the edge of the swelling detection panel contacts the contact sensor unit, and to control an alarm unit to output an alarm message.

19 Claims, 9 Drawing Sheets

(51) Int. Cl.
　　*H01M 50/211* (2021.01)
　　*H01M 50/242* (2021.01)

(52) U.S. Cl.
　　CPC ....... *H01M 50/211* (2021.01); *H01M 50/242* (2021.01); *H01M 2010/4271* (2013.01); *H01M 2220/20* (2013.01); *H01M 2220/30* (2013.01)

(58) Field of Classification Search
　　CPC ..... H01M 2010/4271; H01M 2220/20; H01M 2220/30; G01B 7/16; G01B 5/00; Y02E 60/10
　　See application file for complete search history.

(56) References Cited

U.S. PATENT DOCUMENTS

| | | | |
|---|---|---|---|
| 2012/0052359 A1 | 3/2012 | Yoshitake et al. | |
| 2012/0148890 A1 | 6/2012 | Goto et al. | |
| 2013/0249494 A1* | 9/2013 | Ju ......................... | B60L 3/0046 320/134 |
| 2014/0062418 A1 | 3/2014 | Lim | |
| 2015/0380778 A1 | 12/2015 | Kim et al. | |
| 2017/0092997 A1 | 3/2017 | Fukuda et al. | |

FOREIGN PATENT DOCUMENTS

| | | | | |
|---|---|---|---|---|
| JP | 2003187879 A | 7/2003 | | |
| JP | 2008251437 A | 10/2008 | | |
| JP | 2009301873 A | 12/2009 | | |
| JP | 5489797 B2 | 5/2014 | | |
| JP | 5589275 B2 | 9/2014 | | |
| JP | 2015090970 A | 5/2015 | | |
| JP | 2016177941 A | 10/2016 | | |
| JP | 6225082 B2 | 11/2017 | | |
| JP | 6464731 B2 | 2/2019 | | |
| KR | 101093928 B1 | 12/2011 | | |
| KR | 101272915 B1 | 6/2013 | | |
| KR | 20140032165 A | 3/2014 | | |
| KR | 101700254 B1 | 1/2017 | | |
| KR | 20180113416 A | * 4/2017 | ............. | H01M 2/10 |
| KR | 101738215 B1 | 5/2017 | | |
| KR | 101787634 B1 | 10/2017 | | |
| KR | 101836516 B1 | 3/2018 | | |
| KR | 20180076578 A | 7/2018 | | |
| KR | 20190071407 A | 6/2019 | | |
| WO | WO-2018205598 A1 | * 11/2018 | ............. | H01M 2/10 |

OTHER PUBLICATIONS

Yang, WO-2018205598-A1 machine translation, 2018 (Year: 2018).*
International Search Report for Application No. PCT/KR2020/015888 dated Feb. 23, 2021, 2 pgs.
Extended European Search Report including Written Opinion for Application No. 20889637.3 dated May 14, 2024, pp. 1-7.

* cited by examiner

BATTERY MANAGEMENT SYSTEM  10

SWELLING DETECTION DEVICE

ELECTRIC DRIVING MECHANISM  10

SWELLING DETECTION DEVICE

FIG. 10

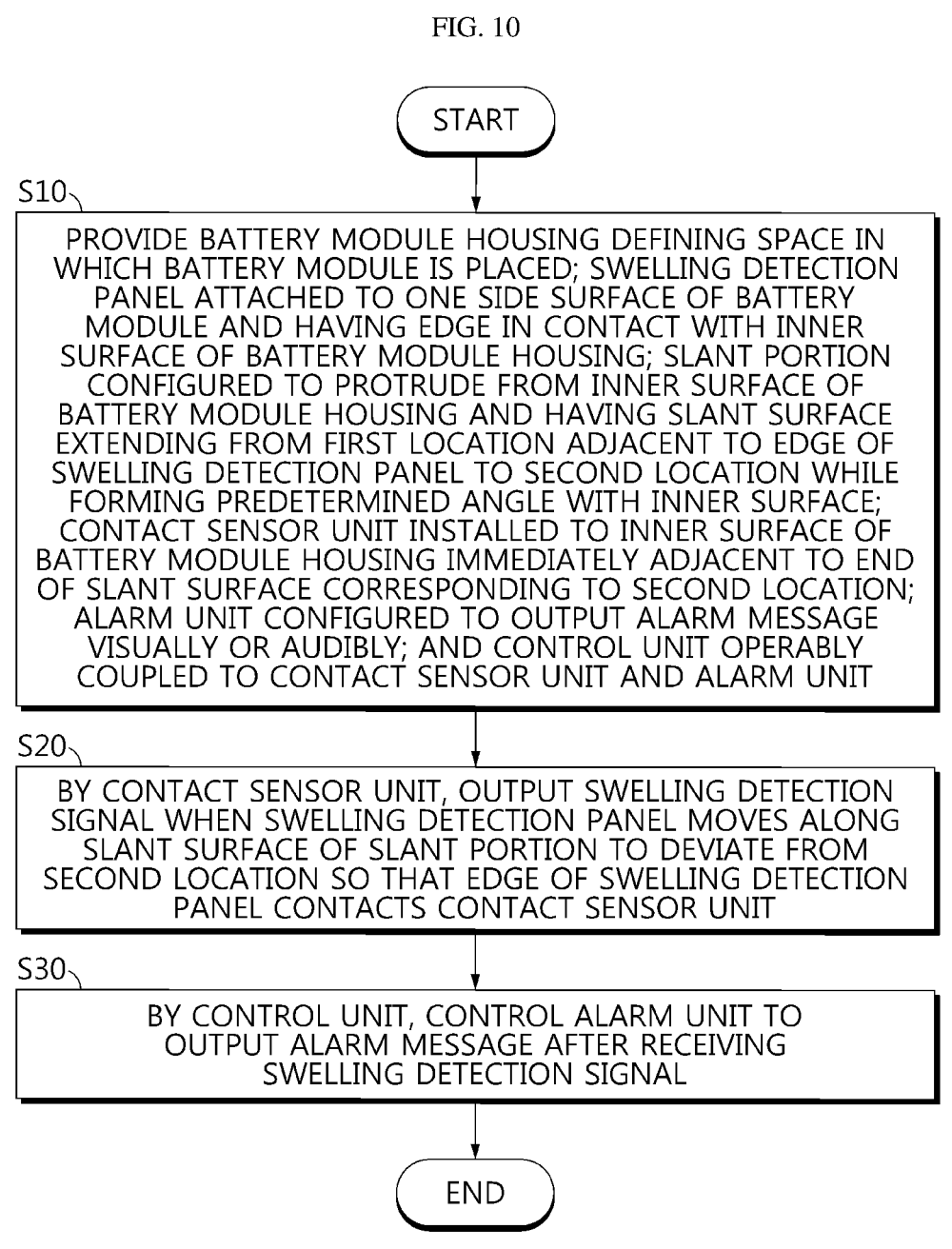

START

S10

PROVIDE BATTERY MODULE HOUSING DEFINING SPACE IN WHICH BATTERY MODULE IS PLACED; SWELLING DETECTION PANEL ATTACHED TO ONE SIDE SURFACE OF BATTERY MODULE AND HAVING EDGE IN CONTACT WITH INNER SURFACE OF BATTERY MODULE HOUSING; SLANT PORTION CONFIGURED TO PROTRUDE FROM INNER SURFACE OF BATTERY MODULE HOUSING AND HAVING SLANT SURFACE EXTENDING FROM FIRST LOCATION ADJACENT TO EDGE OF SWELLING DETECTION PANEL TO SECOND LOCATION WHILE FORMING PREDETERMINED ANGLE WITH INNER SURFACE; CONTACT SENSOR UNIT INSTALLED TO INNER SURFACE OF BATTERY MODULE HOUSING IMMEDIATELY ADJACENT TO END OF SLANT SURFACE CORRESPONDING TO SECOND LOCATION; ALARM UNIT CONFIGURED TO OUTPUT ALARM MESSAGE VISUALLY OR AUDIBLY; AND CONTROL UNIT OPERABLY COUPLED TO CONTACT SENSOR UNIT AND ALARM UNIT

S20

BY CONTACT SENSOR UNIT, OUTPUT SWELLING DETECTION SIGNAL WHEN SWELLING DETECTION PANEL MOVES ALONG SLANT SURFACE OF SLANT PORTION TO DEVIATE FROM SECOND LOCATION SO THAT EDGE OF SWELLING DETECTION PANEL CONTACTS CONTACT SENSOR UNIT

S30

BY CONTROL UNIT, CONTROL ALARM UNIT TO OUTPUT ALARM MESSAGE AFTER RECEIVING SWELLING DETECTION SIGNAL

END

APPARATUS AND METHOD FOR DETECTING SWELLING OF BATTERY MODULE

CROSS-REFERENCE TO RELATED APPLICATIONS

The present application is a national phase entry under 35 U.S.C. § 371 of International Application No. PCT/KR2020/015888 filed Nov. 12, 2020, which claims priority from Korean Patent Application No. 10-2019-0149841 filed Nov. 20, 2019, and Korean Patent Application No. 10-2020-0149665, filed Nov. 10, 2020 all of which are incorporated herein by reference.

TECHNICAL FIELD

The present disclosure relates to an apparatus and method for detecting swelling of a battery module, and more particularly, to an apparatus and method capable of easily detecting that battery cells included in a battery module are swelling.

BACKGROUND ART

A lithium ion battery cell experiences a swelling phenomenon since gas is generated therein depending on the use condition and environment. It is known that gas is mainly generated due to a side reaction of an electrolyte injected into the battery cell.

The battery cell where the swelling phenomenon occurs has a deteriorated charge/discharge performance. In addition, if the pressure inside the battery cell exceeds a threshold value, a case of the battery cell is ruptured so that toxic gas is vented to the outside.

The case of the lithium ion battery cell is made of a flexible pouch film, for example Since the pouch film has weak rigidity, when the pressure inside the battery cell increases above the limit due to the swelling phenomenon, the sealing part with weak bonding force is ruptured so that gas is leaked to the outside.

The application field of the lithium ion battery cell is rapidly increasing not only to mobile devices such as cellular phones, laptop computers, smart phones and smart pads, but also electric-driven vehicles (electric vehicles (EVs), hybrid electric vehicles (HEVs), plug-in hybrid electric vehicles (PHEVs)), large-capacity energy storage systems (ESS), or the like.

In particular, a battery module mounted on the electric-driven vehicle includes a plurality of battery cells connected in series and/or in parallel to secure a high energy capacity.

If some battery cells in the battery module cause a swelling phenomenon, the performance of the entire battery module is degraded. In addition, if the swelled battery cells cause venting while the electric-driven vehicle is running, toxic gas is ejected to the outside, and in the worst case, the charging and discharging of the battery cells that cause venting is stopped, which may result in sudden stop of the electric-driven vehicle. In addition, when a plurality of battery cells cause venting, toxic gas may ignite, which may lead to an accident in which the battery module explodes.

Therefore, in a device equipped with a battery module, there is a need for developing a technology capable of easily detecting that the battery cells included in the battery module are swelling.

SUMMARY

Technical Problem

The present disclosure is designed to solve the problems of the related art, and therefore the present disclosure is directed to providing an apparatus and method capable of easily detecting that battery cells included in a battery module are swelling over the limit.

Technical Solution

In one aspect of the present disclosure, there is provided an apparatus for detecting swelling of a battery module, comprising: a battery module housing defining a space for accommodating the battery module; a swelling detection panel attached to a side surface of the battery module and having an edge in contact with an inner surface of the battery module housing; a slant portion protruding from the inner surface of the battery module housing and having a slant surface extending from at least a first location adjacent to the edge of the swelling detection panel to a second location while forming an angle with the inner surface; a contact sensor installed within the space of the battery module housing immediately adjacent to the second location; an alarm configured to output an alarm message visually or audibly; and a control unit operably coupled to the contact sensor and the alarm, wherein the contact sensor is configured to output a swelling detection signal in response to the swelling detection panel moving along the slant surface away from the second location such that the edge of the swelling detection panel contacts the contact sensor, and the control unit is configured to control the alarm unit to output the alarm message in response to receiving the swelling detection signal.

In an embodiment, the slant portion may protrude from a plurality of points along the edge of the swelling detection panel.

In an embodiment, the slant portion may have a right-angled triangular section.

In an embodiment, the swelling detection panel may be made of an elastic plastic.

In an embodiment, the contact sensor unit may be a piezoelectric sensor.

In another embodiment, the contact sensor unit may be a button switch. In this case, the button switch may have a first end connected to a DC power supply and a second end connected to the control unit.

In another embodiment, when the edge of the swelling detection panel may be deviated from the slant surface of the slant portion and apply a pressure to the piezoelectric sensor, and the piezoelectric sensor may be configured to output a voltage signal corresponding to the pressure to the control unit.

In another embodiment, when the edge of the swelling detection panel is deviated from the slant surface of the slant portion and applies a pressure to the button switch to press a button, and the first and second ends of the button switch are connected to each other, a voltage of the DC power supply connected to the button switch may be applied to the control unit.

In another aspect of the present disclosure, there is also provided a battery management system or an electric driving mechanism, comprising the apparatus for detecting swelling of a battery module.

In another aspect of the present disclosure, there is also provided a method for detecting swelling of a battery module disposed within a battery module housing, comprising: receiving, by a control unit, from a contact sensor disposed within the battery module housing immediately adjacent to a second location of a slant surface of a slant portion, wherein the slant portion protrudes from an inner surface of the battery module housing, wherein the slant surface extends from at least a first location adjacent to an edge of a swelling detection panel towards the second location at an angle with the inner surface of the battery module housing, wherein the swelling detection panel is attached to a side surface of the battery module, wherein the edge of the swelling detection panel is in contact with the inner surface of the battery module housing, wherein the swelling detection signal indicates swelling detection panel moving along the slant surface away from the second location such that the edge of the swelling detection panel contacts the contact sensor; and controlling, by the control unit, an alarm to output a visual or audible alarm message in response to receiving the swelling detection signal.

Advantageous Effects

According to the present disclosure, it is possible to easily detect that a swelling phenomenon occurs in the battery cells included in the battery module. In particular, since an excessive swelling phenomenon of the battery cells may be detected without changing the internal structure of the battery module, the stability of the battery module may be improved. In particular, the present disclosure may be usefully utilized when the battery module is mounted to an electric-driven vehicle.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 8 is a block diagram showing a battery management system including the apparatus for detecting swelling of a battery module according to an embodiment of the present disclosure.

FIG. 9 is a block diagram showing an electric driving mechanism including the apparatus for detecting swelling of a battery module according to an embodiment of the present disclosure.

FIG. 10 is a flowchart for illustrating a method for detecting swelling of a battery module according to an embodiment of the present disclosure.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the embodiments described below, a battery cell refers to a lithium ion battery cell. Here, the lithium ion battery cell refers to a battery in which lithium ions act as working ions during charging and discharging to induce electrochemical reactions at the positive and negative electrodes.

Meanwhile, even if the name of the battery is changed depending on the type of electrolyte or separator used in the lithium ion battery cell, the type of a packaging material used to package the battery, the internal or external structure of the lithium ion battery cell, or the like, any battery using lithium ions as working ions should be interpreted as being included in the category of lithium ion battery cells.

The present disclosure may also be applied to secondary batteries other than lithium ion battery cells. Therefore, even if the working ions are not lithium ions, any secondary battery to which the technical idea of the present disclosure may be applied should be interpreted as being included in the category of the present disclosure regardless of its type.

In addition, it should be noted in advance that the battery cell may refer to one unit cell or a plurality of unit cells connected in parallel.

Figure 1:
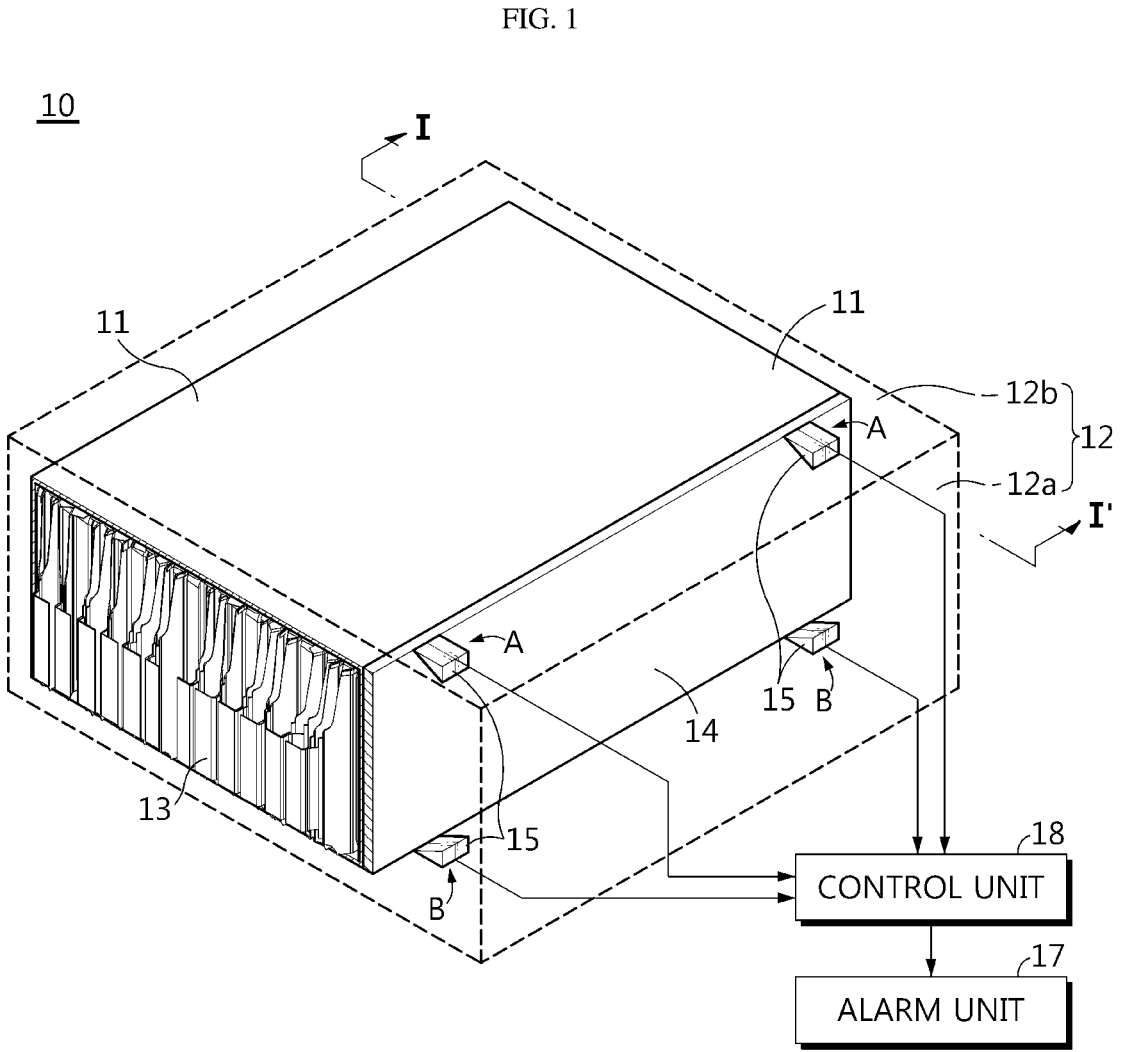
FIG. 1 is a block diagram showing an apparatus for detecting swelling of a battery module according to an embodiment of the present disclosure.

FIG. 1 is a block diagram showing an apparatus for detecting swelling of a battery module according to an embodiment of the present disclosure.

Referring to FIG. 1, a swelling detection apparatus 10 according to an embodiment of the present disclosure includes a battery module housing 12 defining a space in which the battery module 11 is placed.

The battery module 11 includes a plurality of battery cells 13 therein. The plurality of battery cells 13 may be stacked in a certain direction. Although not shown in the drawing, a cartridge frame, a cooling fin and the like may be interposed between the battery cells 13.

The plurality of battery cells 13 may be connected to each other in series and/or in parallel. A connection relationship of a connector component, for example a bus bar, used to electrically connect the plurality of battery cells 13 is not related to the technical idea of the present disclosure and thus will not be described in detail here.

Each battery cell 13 has a structure in which an electrode assembly and an electrolyte are packaged by a pouch packaging material, but the present disclosure is not limited thereto. Each battery cell 13 includes a pair of electrodes exposed to the outside, and the electrodes of neighboring battery cells 13 may be connected in series and/or in parallel.

The battery module housing 12 has an approximate box shape and defines a square space therein. The battery module 11 may be accommodated in the square space. The cross-sectional area of the battery module housing 12 is equal to or larger than the cross-sectional area of the battery module 11.

The battery module housing 12 may include front, rear, left and right walls and upper and lower walls. The front, rear, left and right walls and the lower wall may be integrated to constitute a lower case 12a, and the upper wall may constitute an upper case 12b. In this case, the upper case 12b may serve as a cover.

The lower case 12a and the upper case 12b may be made of metal or plastic and may be bonded to each other by known methods such as bolt, adhesive, and welding.

Since the lower case 12a has an open upper portion, the battery module 11 is placed on a bottom surface of the lower case 12a through the opening of the lower case 12a. In addition, if the upper case 12b is coupled to the lower case 12a, the battery module 11 is accommodated in the battery module housing 12.

The swelling detection apparatus 10 according to the present disclosure includes a swelling detection panel 14 attached to one surface of the battery module 11 and having an edge in contact with an inner surface of the battery module housing 12.

Preferably, the swelling detection panel 14 may be made of an elastic plastic. It is preferable that the swelling detection panel 14 has a thickness of 3 mm to 5 mm.

Preferably, the area of the swelling detection panel 14 is substantially the same as the cross section of the inner space in the battery module housing 12. Here, the cross section refers to a section in a direction perpendicular to the ground.

Figure 2:
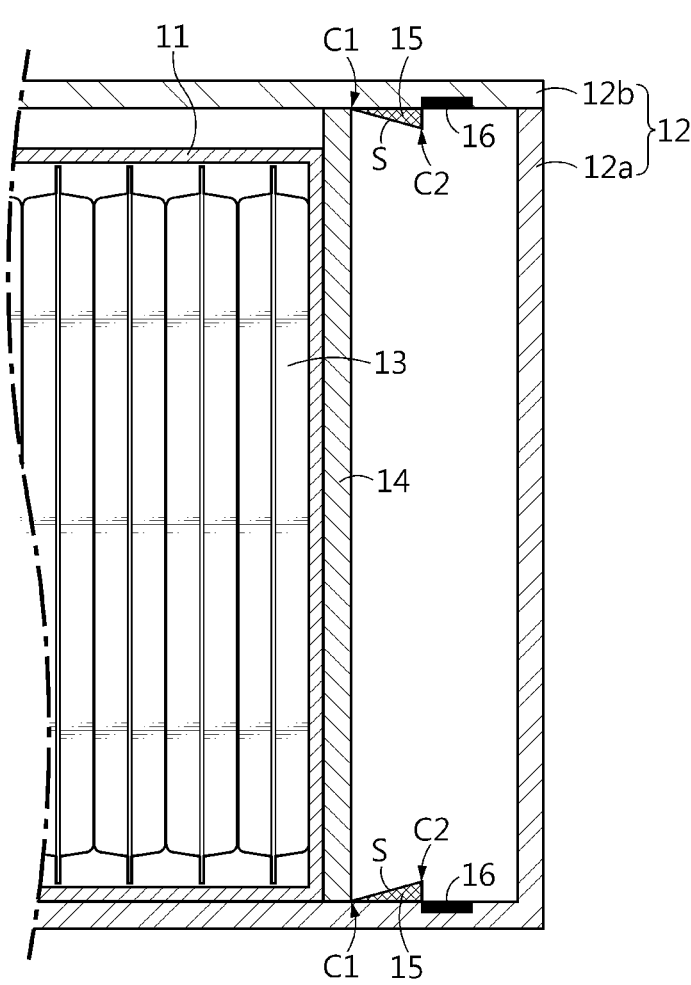
FIG. 2 is a partially sectioned view, taken along the line I-I' of FIG. 1, to illustrate the structures of points A and B of FIG. 1.

FIG. 2 is a partially sectioned view, taken along the line I-I' of FIG. 1, to illustrate the structures of points A and B of FIG. 1.

Referring to FIG. 2, the swelling detection apparatus 10 according to the present disclosure includes a slant portion 15 having a slant surface S, which protrudes from the inner surface of the battery module housing 12 and extends from a first location C1 adjacent to the edge of the swelling detection panel 14 to a second location C2 while forming a predetermined angle with the inner surface.

Preferably, the slant portion 15 may protrude at a plurality of points (see A and B of FIG. 1) along the edge of the swelling detection panel 14.

Even though the drawings show that the slant portion 15 protrudes at two points A (FIG. 1) on a lower inner surface of the upper case 12b of the battery module housing 12 and protrudes at two points B (FIG. 1) of a lower inner surface of the lower case 12a, the present disclosure is not limited thereto.

Preferably, the section of the slant portion 15 has a right-angled triangular shape, and the slant surface S of the slant portion 15 faces a right-angled corner of the right-angled triangle.

Preferably, the length of the slant portion 15 may be adjusted in advance according to the degree of swelling to be detected. The length of the slant portion 15 and the sensitivity of swelling detection are inversely proportional to each other. That is, as the sensitivity of swelling detection is higher, the length of the slant portion 15 becomes shorter.

The swelling detection apparatus 10 according to an embodiment of the present disclosure includes a contact sensor unit 16 installed at the inner surface of the battery module housing 12 immediately adjacent to an end of the slant surface S corresponding to the second location C2 of the slant portion 15.

Preferably, the contact sensor unit 16 may be a piezoelectric sensor. The piezoelectric sensor refers to a sensor that outputs a voltage signal corresponding to the magnitude of a pressure when a specific object comes into contact to apply the pressure. Since the piezoelectric sensor is widely known in the art, it will not be described in detail here.

Alternatively, the contact sensor unit 16 may be a button switch. The button switch refers to a switch that mechanically contacts a contact point of a switch or release the contact by the push/pull operation of the button.

The button switch includes a spring for elastically biasing the button and two contact points whose electrical connection is selectively controlled by the push/pull operation of the elastically biased button.

The button switch is a well-known electrical component widely known in the art and thus will not be described in detail here.

Preferably, one contact point of the button switch is connected to a DC power supply and the other contact point is connected to the control unit 18 via a conductive wire. Therefore, if the button switch is pushed, the two contacts may be connected to each other so that the voltage of the DC power supply is applied to the control unit 18.

Referring to FIG. 1, the swelling detection apparatus 10 according to the present disclosure may include an alarm unit 17 that visually or audibly outputs an alarm message.

The alarm unit 17 may be a display or a speaker. The display outputs an alarm message in the form of text or graphic, and the speaker outputs an alarm message in the form of voice or alarm sound. The display may be a liquid crystal display, an organic light emitting diode display, or the like, but the present disclosure is not limited thereto.

The swelling detection apparatus 10 according to the present disclosure includes a control unit 18 operably coupled to the contact sensor unit 16 and the alarm unit 17.

The contact sensor unit 16 may output a swelling detection signal when the swelling detection panel 14 moves along the slant surface S of the slant portion 15 and then is deviated from the second location C2 so that the edge of the swelling detection panel 14 contacts the contact sensor unit 16.

If a swelling phenomenon occurs in some or all of the plurality of battery cells 13 included in the battery module 11 so that the outer wall (especially, the left or right wall) of the battery module 11 is inflated, the swelling detection panel 14 may move along the slant surface S of the slant portion 15 due to the pressure applied by the battery module 11.

Figure 3:
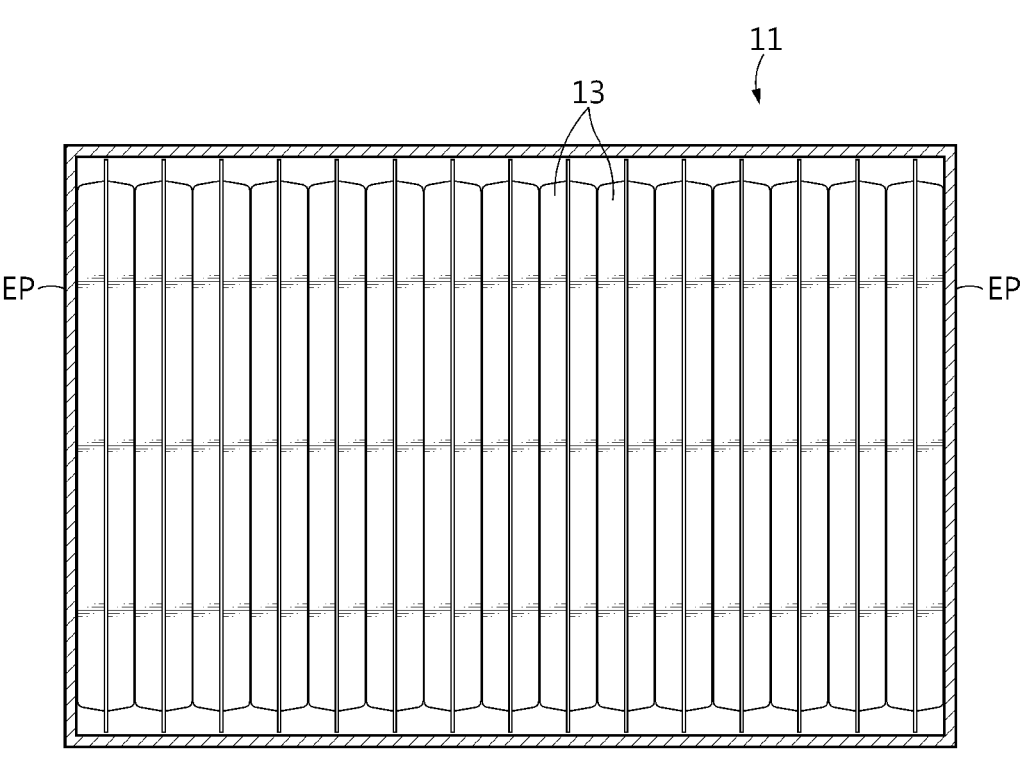
FIG. 3 is a sectional view showing a battery module having no battery cell in which the swelling phenomenon occurs.
Figure 4:
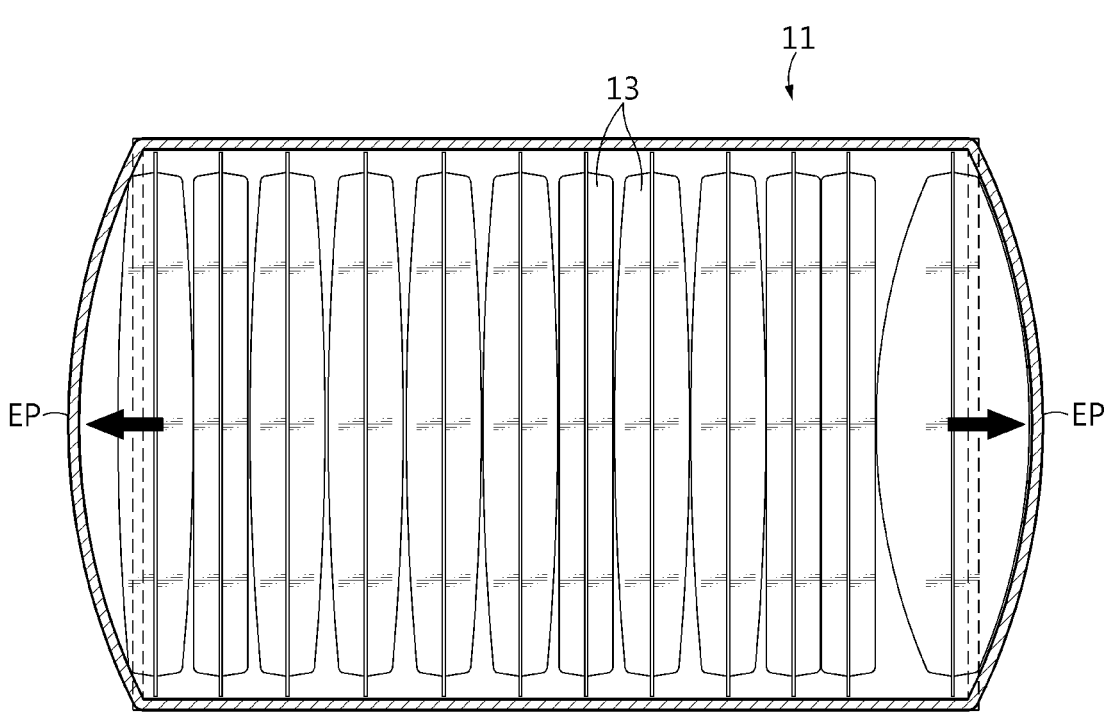
FIG. 4 is a sectional view showing a battery module including a battery cell in which the swelling phenomenon occurs.

FIG. 3 is a sectional view showing a battery module having no battery cell in which the swelling phenomenon occurs, and FIG. 4 is a sectional view showing a battery module including a battery cell in which the swelling phenomenon occurs.

As shown in FIGS. 3 and 4, if a swelling phenomenon occurs in some battery cells included in the battery module 11, the inflated battery cell presses the remaining cells to the left and right. In addition, the pressing force reaches an outermost end plate EP that is a component of the case of battery module 11. Since the end plate EP is made of a thin metal or plastic plate, the end plate EP is deformed into a curved surface when a pressure is applied thereto. As a result, the battery module 11 presses the swelling detection panel 14 toward the slant portion 15, and the pressed swelling detection panel 14 moves along the slant surface S.

Figure 5:
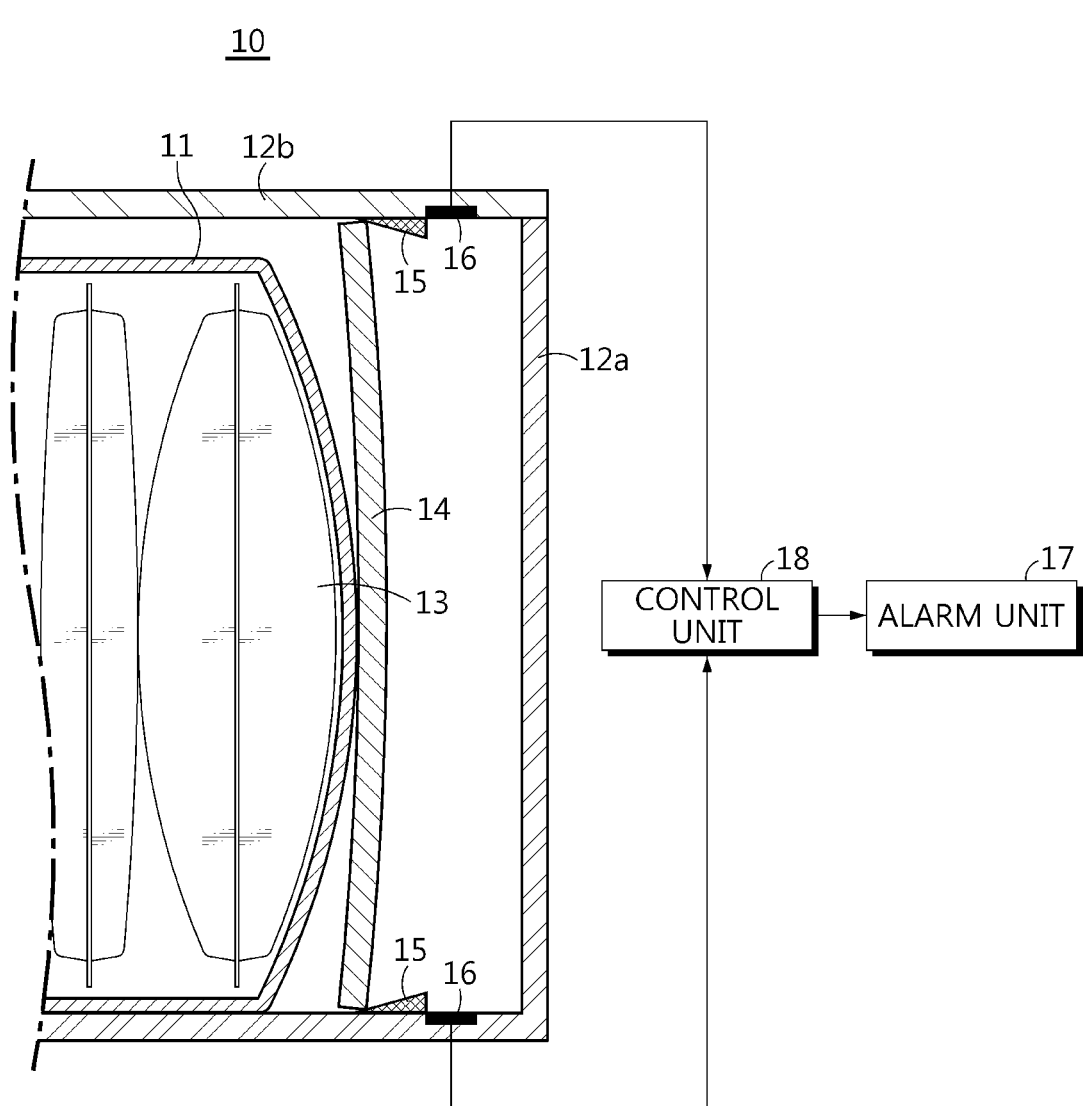
FIG. 5 is a diagram showing that a swelling detection panel moves along a slant surface of a slant portion.
Figure 6:
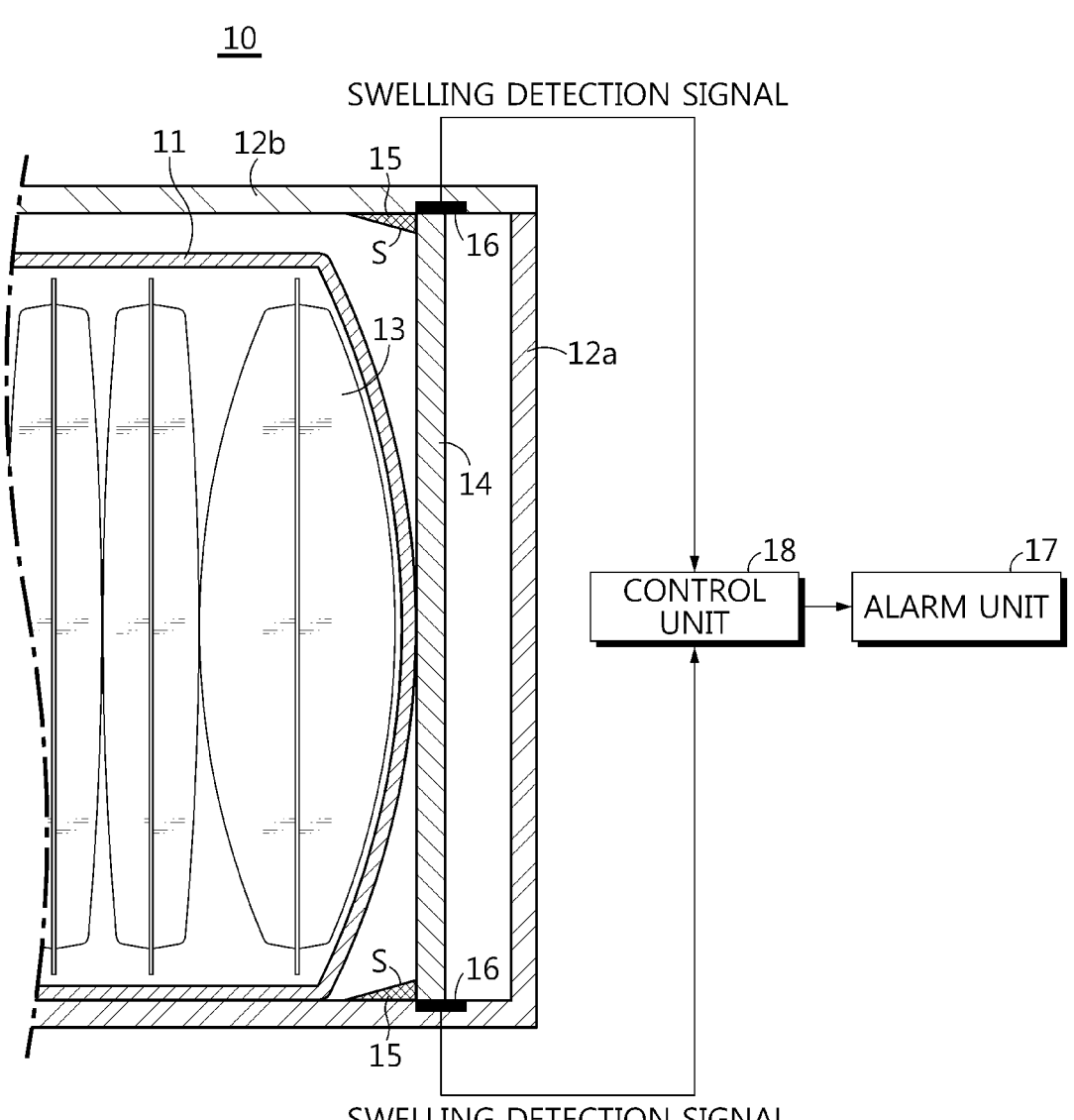
FIG. 6 is a diagram showing that the swelling detection panel is entirely deviated from the slant surface of the slant portion.

FIG. 5 is a diagram showing that the swelling detection panel 14 moves along the slant surface S of the slant portion 15, and FIG. 6 is a diagram showing that the swelling detection panel 14 is entirely deviated from the slant surface S of the slant portion 15.

Since the swelling detection panel 14 has an elastic force in itself as shown in the drawing, its shape is deformed to form a smooth curved surface when being moved along the slant surface S of the slant portion 15.

In addition, if the pressure applied by the battery module 11 exceeds a threshold value, the swelling detection panel 14 moves to the second point C2 of the slant surface S, and then suddenly is deviated from the slant surface of the slant portion 15 to make strong contact with the contact sensor unit 16. In addition, if the swelling detection panel 14 is deviated from the slant surface S, the elastic biased state is released, so the edge portion of the swelling detection panel 14 applies a strong pressure to the contact sensor unit 16 for a short period of time.

Therefore, if the contact sensor unit 16 is a piezoelectric sensor, when the edge of the swelling detection panel 14 is deviated from the slant surface S of the slant portion 15 and applies a pressure to the piezoelectric sensor, the piezoelectric sensor outputs a voltage signal corresponding to the pressure to the control unit 18.

In addition, if the contact sensor unit 16 is a button switch, when the edge of the swelling detection panel 14 is deviated from the slant surface S of the slant portion 15 and applies a pressure to the button switch to press the button, the contact points of the button switch are connected to each other so that the voltage of the DC power supply connected to the button switch is applied to the control unit 18.

As a result, it is possible to detect that the swelling detection panel 14 is deviated from the slant surface S while moving along the slant surface S of the slant portion 15 as the swelling phenomenon exceeds the threshold value since the shape of the battery module 11 is deformed due to swelling of the battery cell(s) included in the battery module 11.

Preferably, the control unit 18 may determine that the swelling detection panel 14 is deviated from the slant surface S of the slant portion 15 when at least one swelling detection signal is received from the plurality of contact sensor units 16.

Preferably, the control unit 18 may control the alarm unit 17 to output an alarm message if the swelling detection signal is received from the contact sensor unit 16.

For example, control unit 18 visually outputs an alarm message through a display. As another example, the control unit 18 audibly outputs an alarm message or an alarm sound through a speaker.

The alarm message informs a user or driver of the device equipped with the battery module 11 that the battery cell(s) in the battery module 11 is in an excessively swelled state.

If the alarm message is output visually or audibly through alarm unit 17, it preferable that the user or driver stops the operation of battery module 11, then checks the state of battery module 11 and replaces the battery module 11 if necessary.

According to another embodiment, the alarm unit 17 may be provided in a load device to which the battery module 10 is mounted. For example, if the battery module 10 is mounted to an electric-driven vehicle, the alarm unit 17 may be an integrated vehicle information indicator provided to a dashboard of the electric-driven vehicle.

In this case, the control unit 18 may transmit the alarm message to a control system of the electric-driven vehicle through a communication interface. In addition, the control system may request a driver to check the battery module 10 by visually or audibly outputting an alarm message through the integrated vehicle information indicator.

Any known communication interface that supports communication between two different communication media may be used as the communication interface. The communication interface may support wired or wireless communication. Preferably, the communication interface may support CAN communication or daisy chain communication.

Since the alarm unit 17 may be provided to a load device as described, it should be understood that the present disclosure also includes an embodiment in which the control unit 18 outputs an alarm message to the alarm unit 17 through a control system provided in the load device.

Meanwhile, in the present disclosure, the swelling detection panel 14 may be used as a component of the battery module 11 by replacing the end plate of the battery module 11.

Figure 7:
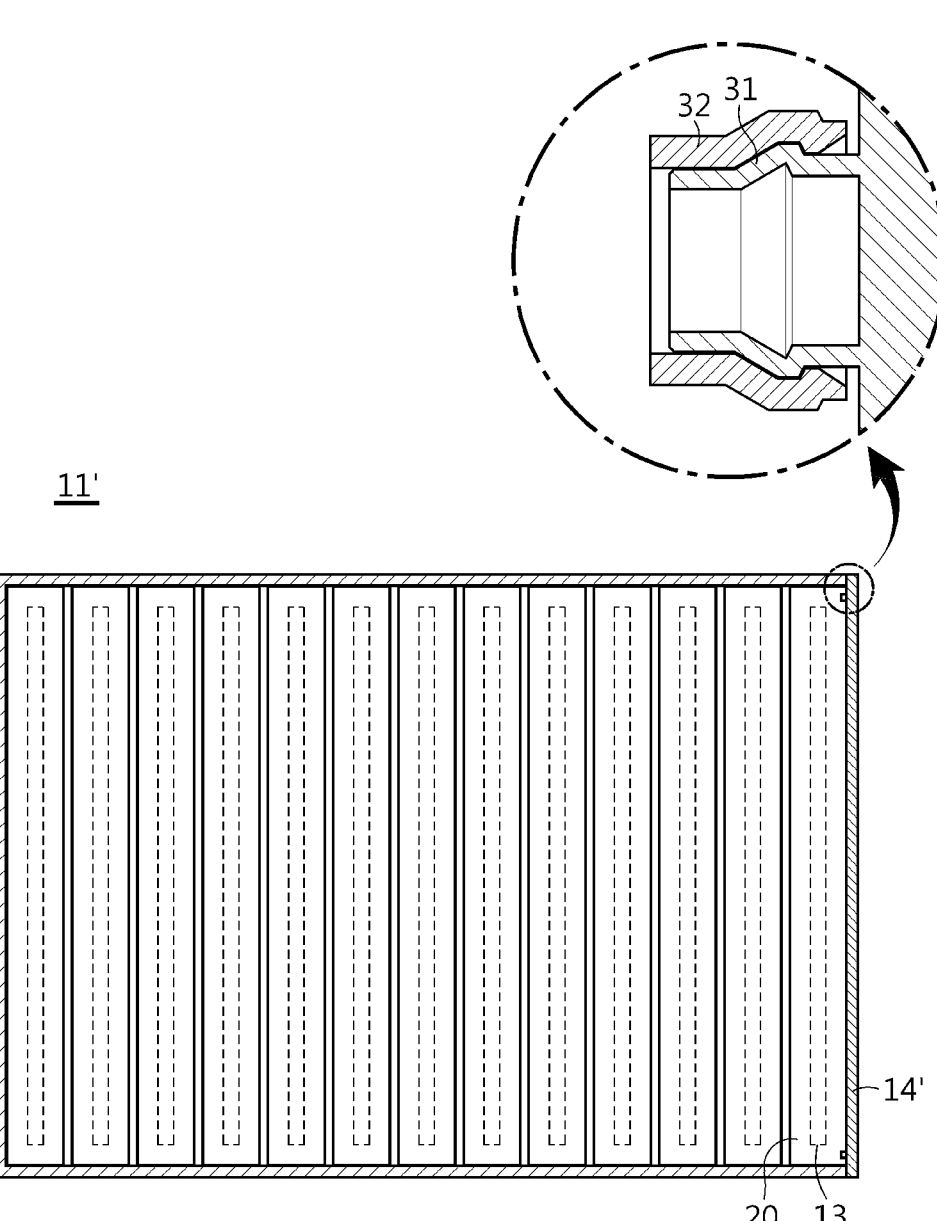
FIG. 7 is a sectional view showing a battery module in case the swelling detection panel configures a part of the battery module.

FIG. 7 is a sectional view showing a battery module 11' in case the swelling detection panel 14' configures a part of the battery module 11'.

Referring to FIG. 7, the battery module 11' may include a plurality of cartridge 20. Each cartridge 20 surrounds at least one battery cell 13 included therein. The cartridge 20 may be made of a plastic or metal material with thermal conductivity. Electrodes (not shown) of the battery cell 13 are exposed at one side of the cartridge 20, and the exposed electrodes may be electrically connected by means of welding.

The swelling detection panel 14' may be coupled to an outermost cartridge 20 that surrounds the outermost battery cell. In one example, the outermost cartridge 20 is located at a rightmost side on the drawing.

Preferably, the swelling detection panel 14' may have a snap-fit protrusion 31 on a surface opposite to the outermost cartridge 20, and a snap-fit groove 32 may be provided at the surface of the outermost cartridge 20. In this case, the swelling detection panel 14' may be snap-fitted to the outermost cartridge 20 to serve as the end plate of the battery module 11'. The snap-fit coupling allows the swelling detection panel 14' connected to the battery module 11' as an end plate to be easily separated from the outermost cartridge 20 when the swelling detection panel 14' is deviated from the second point C2 of the slant surface S while moving along the slant surface S of the slant portion 15.

If the battery module 11' has the structure shown in FIG. 7, it is preferable that the height of the battery module 11' corresponds to the height of the internal space of the battery module housing 12. That is, the height between the top and the bottom of the swelling detection panel 14' may be substantially the same as the distance between the inner surface of the upper wall and the inner surface of the lower wall of the battery module housing 12.

Unlike FIG. 7, the snap-fit groove 32 may also be provided at an end wall of the battery module 11'. In this case, the swelling detection panel 14' may be snap-fitted to the end wall of the battery module 11'. To this end, the location of the snap-fit protrusion 31 may be adjusted to correspond to the location of the snap-fit groove 32 formed at the end wall of the battery module 11'.

In the present disclosure, the control unit 18 may optionally include a processor, an application-specific integrated circuit (ASIC), another chipset, a logic circuit, a register, a communication modem, a data processing device, or the like, known in the art to execute control logics. In addition, when the control logic is implemented in software, the control unit 18 may be implemented as a set of program modules. At this time, the program module may be stored in a memory and executed by a processor. The memory may be provided inside or outside the processor and be connected to the processor through various well-known computer components.

In addition, one or more of the various control logics of the control unit 18 may be combined, and the combined control logics may be written in a computer-readable code system and recorded in a computer-readable recording medium. The recording medium is not particularly limited as long as it is accessible by a processor included in a computer. As an example, the recording medium includes at least one selected from the group consisting of a read-only memory (ROM), a random-access memory (RAM), a register, a CD-ROM, a magnetic tape, a hard disk, a floppy disk and an optical data recording device. The code system may be distributed to a networked computer to be stored and executed therein. In addition, functional programs, codes and code segments for implementing the combined control logics may be easily inferred by programmers in the art to which the present disclosure belongs.

Figures 8, 9:
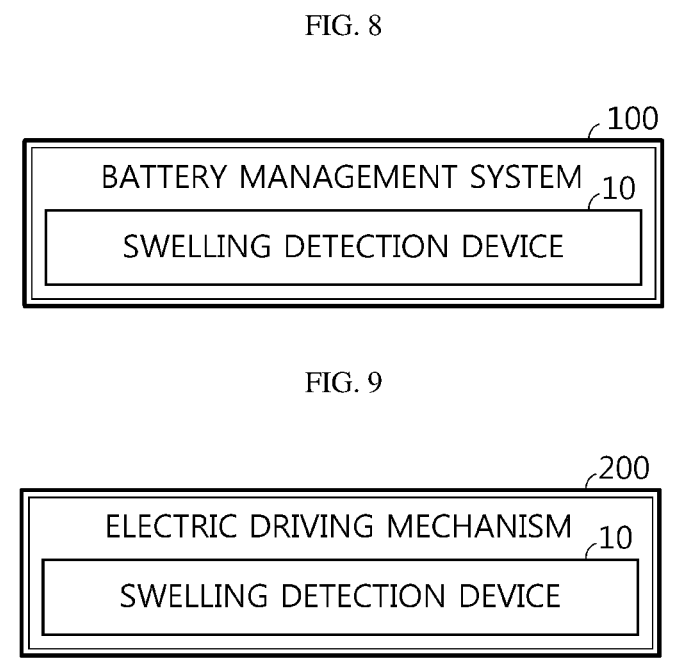

The swelling detection apparatus 10 according to the present disclosure may be included in a battery management system 100 as shown in FIG. 8. The battery management system 100 controls the overall operation related to charging and discharging of a battery and is a computing system called a battery management system (BMS) in the art.

In addition, the swelling detection apparatus 10 according to the present disclosure may be mounted to an electric driving mechanism 200 as shown in FIG. 9.

The electric driving mechanism 200 may be an electric power device movable by electricity, such as an electric-driven vehicle, an electric bicycle, an electric motorcycle, an electric train, an electric ship and an electric plane, or a power tool having a motor, such as an electric drill and an electric grinder.

FIG. 10 is a flowchart for illustrating a method for detecting swelling of a battery module according to an embodiment of the present disclosure.

Referring to FIG. 10, first in Step S10, there are provided a battery module housing 12 defining a space in which the battery module 11 is mounted; a swelling detection panel 14 attached to one side surface of the battery module 11 and having an edge in contact with the inner surface of the battery module housing 12; a slant portion 15 configured to protrude from the inner surface of the battery module housing 12 and having a slant surface S extending from a first location C1 adjacent to the edge of the swelling detection panel 14 to a second location C2 while forming a predetermined angle with the inner surface; a contact sensor unit 16 installed to the inner surface of the battery module housing 12 immediately adjacent to the end of the slant surface S corresponding to the second location C2; an alarm unit 17 configured to output an alarm message visually or audibly; and a control unit 18 operably coupled to the contact sensor unit 16 and the alarm unit 17.

In Step S20, the contact sensor unit 16 outputs a swelling detection signal when the swelling detection panel 14 moves along the slant surface of the slant portion 15 to deviate from the second location C2 of the slant surface S and contact the contact sensor unit 16.

In Step S20, each of the plurality of contact sensor units 16 may output a swelling detection signal.

In Step S30, if the control unit 18 receives at least one swelling detection signal from the plurality of contact sensor units 16, the control unit 18 outputs an alarm message through the alarm unit 17.

Preferably, the alarm unit 17 is a display or speaker. Accordingly, in Step S30, the control unit 18 may output the alarm message visually through the display or output the alarm message audibly through the speaker.

According to the present disclosure, it is possible to easily detect that a swelling phenomenon occurs in the battery cells included in the battery module. In particular, since an excessive swelling phenomenon of the battery cells may be detected without changing the internal structure of the battery module, the stability of the battery module may be improved. In particular, the present disclosure may be usefully utilized when the battery module is mounted to an electric-driven vehicle.

In the description of the various exemplary embodiments of the present disclosure, it should be understood that the element referred to as 'unit' is distinguished functionally rather than physically. Therefore, each element may be selectively integrated with other elements or each element may be divided into sub-elements for effective implementation control logic(s). However, it is obvious to those skilled in the art that, if functional identity can be acknowledged for the integrated or divided elements, the integrated or divided elements fall within the scope of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An apparatus for detecting swelling of a battery module, comprising:

a battery module housing defining a space for accommodating the battery module;

a swelling detection panel attached to a side surface of the battery module and having an edge in contact with an inner surface of the battery module housing, wherein the swelling detection panel is configured to move within an internal space of the battery module housing along a swelling direction away from the battery module as the swelling of the battery module increases;

a slant portion protruding from the inner surface of the battery module housing into the internal space of the battery module housing, wherein the slant portion is tapered to increasingly narrow the internal space of the battery module housing in the swelling direction from a first location adjacent to the edge of the swelling detection panel to a second location;

a contact sensor installed within the space of the battery module housing immediately after the second location along the swelling direction;

an alarm configured to output an alarm message visually or audibly; and a control unit operably coupled to the contact sensor and the alarm, wherein the contact sensor is configured to output a swelling detection signal in response to the swelling detection panel moving in the swelling direction along the slant portion past the second location along the swelling direction such that the edge of the swelling detection panel contacts the contact sensor, and the control unit is configured to control the alarm unit to output the alarm message in response to receiving the swelling detection signal.

2. The apparatus according to claim 1, further comprising a plurality of slant portions, each slant portion protruding from a respective point along the edge of the swelling detection panel.

3. The apparatus according to claim 1, wherein the slant portion has a right-angled triangular section.

4. The apparatus according to claim 1, wherein the swelling detection panel is made of an elastic plastic.

5. The apparatus according to claim 1, wherein the contact sensor is a piezoelectric sensor.

6. The apparatus according to claim 5, when the edge of the swelling detection panel is deviated from the slant surface of the slant portion and applies a pressure to the piezoelectric sensor, and the piezoelectric sensor is configured to output a voltage signal corresponding to the pressure to the control unit.

7. The apparatus according to claim 1, wherein the contact sensor is a button switch.

8. The apparatus according to claim 7, wherein the button switch has a first end connected to a DC power supply and a second end connected to the control unit.

9. The apparatus according to claim 8, when the edge of the swelling detection panel is deviated from the slant surface of the slant portion and applies a pressure to the button switch to press a button, and the first and second ends of the button switch are connected to each other, a voltage of the DC power supply connected to the button switch is applied to the control unit.

10. The apparatus according to claim 1, wherein, as a swelling force of the battery module exerted on the swelling detection panel against the slant portion increases, the swelling detection panel is configured to store elastic potential energy, and wherein the swelling detection panel is configured to release the elastic potential energy after moving past the second location.

11. The apparatus according to claim 10, wherein the released elastic potential energy causes the swelling detection panel to contact the contact sensor.

12. A battery management system, comprising the apparatus according to claim 1.

13. An electric driving mechanism, comprising the apparatus according to claim 1.

14. A method for detecting swelling of a battery module disposed within a battery module housing, the method comprising:

moving, by a swelling detection panel, along a swelling direction away from the battery module as the swelling of the battery module increases, wherein the swelling detection panel is attached to a side surface of the battery module and has an edge in contact with an inner surface of the battery module housing, wherein as the swelling detection panel moves along a slant portion protruding from the inner surface of the battery module housing into the internal space of the battery module housing, wherein the slant portion is tapered to increasingly narrow the internal space of the battery module housing in the swelling direction from a first location adjacent to the edge of the swelling detection panel to a second location;

receiving, by a control unit, a swelling detection signal from a contact sensor disposed within the battery module housing immediately after the second location along the swelling direction, wherein the swelling detection signal indicates swelling detection panel moving in the swelling direction along the slant portion past the second location such that the edge of the swelling detection panel contacts the contact sensor; and controlling, by the control unit, an alarm to output a visual or audible alarm message in response to receiving the swelling detection signal.

15. The method according to claim 14, wherein the swelling detection panel is made of an elastic plastic.

16. The method according to claim 14, wherein the contact sensor unit is a piezoelectric sensor.

17. The method according to claim 14, wherein the contact sensor unit is a button switch.

18. The method according to claim 17, wherein the button switch has a first end connected to a DC power supply and a second end connected to the control unit.

19. The method according to claim 14, wherein the swelling detection panel moves in the first direction along a plurality of slant portions, each slant portion protruding at a respective point along the edge of the swelling detection panel.

* * * * *